United States Patent [19]
Harshbarger et al.

[11] Patent Number: 6,018,314
[45] Date of Patent: Jan. 25, 2000

[54] METHOD FOR OBTAINING PPS ACCURACY USING AN UNCLASSIFIED GPS RECEIVER MEASUREMENT INTERFACE

[75] Inventors: Steven A. Harshbarger; Jean J. Pollari, both of Cedar Rapids; Mark R. Wagner, Marion, all of Iowa

[73] Assignee: Rockwell International Corporation, Milwaukee, Wis.

[21] Appl. No.: 09/026,192

[22] Filed: Feb. 19, 1998

[51] Int. Cl.$^7$ ................................ G01S 5/02; H04B 7/185
[52] U.S. Cl. ................................ 342/357.06; 342/357.01; 701/213
[58] Field of Search ..................... 342/357.01, 357.06, 342/352; 701/213; 380/23

[56] References Cited

U.S. PATENT DOCUMENTS

| | | | |
|---|---|---|---|
| 5,311,194 | 5/1994 | Brown | 342/357 |
| 5,689,271 | 11/1997 | Lennen | 342/357 |
| 5,757,916 | 5/1998 | MacDoran et al. | 380/25 |

Primary Examiner—Thomas H. Tarcza
Assistant Examiner—Dao L. Phan
Attorney, Agent, or Firm—Kyle Eppele; James P. O'Shaughnessy

[57] ABSTRACT

Disclosed are methods for minimizing the security boundary of PPS GPS receivers. The primary disclosure is a lump sum SA correction method. This method can be used to limit the security boundary to the portion of the GPS receiver that generates the lump sum SA correction, allowing all PPS measurement processing (within the receiver or across a PPS measurement interface) to reside outside the security boundary. In addition, two methods are disclosed (passive residual method and active residual method) by which the data content of the PPS measurement interface is entirely unclassified when keyed, thereby limiting the security boundary to the GPS receiver itself.

29 Claims, 4 Drawing Sheets

METHOD FOR OBTAINING PPS ACCURACY USING AN UNCLASSIFIED GPS RECEIVER MEASUREMENT INTERFACE

FIELD OF THE INVENTION

The present invention relates generally to global positioning system (GPS) receivers. More particularly, the present invention relates to GPS receivers which utilize methods for obtaining PPS accuracy with an unclassified PPS measurement interface.

BACKGROUND OF THE INVENTION

The GPS is a satellite-based navigation system. A GPS receiver measures the time offset between a Pseudo Random Noise (PRN) code received from a GPS satellite and a locally generated PRN code. The GPS receiver uses the time offset (referred to as a pseudorange measurement) from at least four satellites along with satellite position information broadcast by the satellites (referred to as ephemeris) to determine the receiver's location. The pseudorange measurement and satellite ephemeris are intentionally degraded by the U.S. Government using a Department of Defense (DoD) classified technique called Selective Availability (SA). An authorized user can enter a key supplied by the National Security Agency into the receiver. The receiver will use this key to remove the effects of SA from the pseudorange measurement and satellite ephemeris, thereby accessing what is referred to as the GPS Precise Positioning Service (PPS).

A GPS satellite also broadcasts, in encrypted form, Wide Area GPS Enhancement (WAGE) corrections. An authorized GPS receiver decrypts the WAGE corrections using the same key as used for SA and applies them to the pseudorange measurements to compensate for unintended system errors. WAGE corrections are not required to obtain PPS accuracy, but do allow the GPS receiver to obtain even better accuracy than PPS alone. Since WAGE corrections may be treated as just another component of SA compensation, references to SA in this disclosure should be understood to mean both with and without WAGE.

The DoD has classified SA correction components as secret. A keyed receiver must compute the SA correction components and apply them to the ephemeris and pseudorange measurements. The DoD has also classified as secret both satellite position derived from corrected ephemeris and pseudorange measurements corrected for satellite clock related SA components as secret. The DoD controls the security boundaries for all PPS-capable GPS receivers. A GPS receiver's security boundary includes all hardware and software that access classified data. The DoD requires that security reviews be held to ensure that the boundary is defined properly, that classified data within the boundary is handled properly, and that the hardware and software in the boundary are developed using the appropriate procedures. These special reviews and procedures are expensive, and the more receiver hardware/software inside the security boundary, the more involved the process.

The process becomes even more complicated when a host application needs to process pseudorange measurements outside the GPS receiver. This entails definition of a data interface between receiver and host that shall be referred to herein as a "GPS measurement interface." If a GPS receiver makes corrected satellite position and pseudorange measurements available over such an interface, the interface becomes classified secret and the security boundary of the receiver extends to include parts of the host application. This further increases cost since the host must now participate in the DoD security review process. A GPS measurement interface whose purpose is to enable processing of pseudorange measurements from a keyed receiver with PPS accuracy shall be referred to herein as a "PPS measurement interface".

SUMMARY OF THE INVENTION

Disclosed are methods for minimizing the security boundary of PPS GPS receivers. The primary disclosure is a lump sum SA correction method. This method can be used to limit the security boundary to the portion of the GPS receiver that generates the lump sum SA correction, allowing all PPS measurement processing (within the receiver or across a PPS measurement interface) to reside outside the security boundary. In addition, two methods are disclosed (passive residual method and active residual method) by which the data content of the PPS measurement interface is entirely unclassified when keyed, thereby limiting the security boundary to the GPS receiver itself.

DETAILED DESCRIPTION OF THE PREFERRED EMBODIMENTS

The present invention includes methods of minimizing the security boundary of a GPS receiver, especially while supporting a PPS measurement interface. A PPS measurement interface is herein defined to be an interface and circuitry adapted to output line-of-sight measurements from a keyed GPS receiver together with enough satellite-related data to permit processing of those measurements with full PPS accuracy into a solution for user position, velocity, and time.

The following terms are referenced in this section and pertain to operation of a keyed GPS receiver. A (U) following the term indicates that the data represented by the term is unclassified, while an (S) indicates that the data represented by the term is classified secret by the Department of Defense (DoD). A (FOUO) indicates that the data represented by the term is unclassified, but restricted For Official Use Only. As used throughout this document, references to data being classified or unclassified is intended to represent the defined DoD classification of the data.

Definitions

P=receiver's or host's estimate of user position (U,FOUO)

b=receiver's or host's estimate of range bias (clock phase error X speed of light) (U)

$PR_{raw}$=raw pseudorange measured by the receiver (U)

$D_{Delay}$=deterministic correction for signal delays due to ionosphere, troposphere, and receiver hardware (U)

$D_{SVclk}$=deterministic correction for satellite clock error as derived by an unkeyed receiver (U)

$cD_{SVclk}$=deterministic correction for satellite clock error as derived by a keyed receiver (with/without WAGE) (S)

S=satellite position derived using uncorrected ephemeris (U)

cS=satellite position derived using ephemeris that has been corrected for SA error (S)

e=unit line of sight vector from user to satellite (U) (=R/r, where R=cS-P and r=∥R∥)

Standard PPS Measurement Interface

Figure 1:
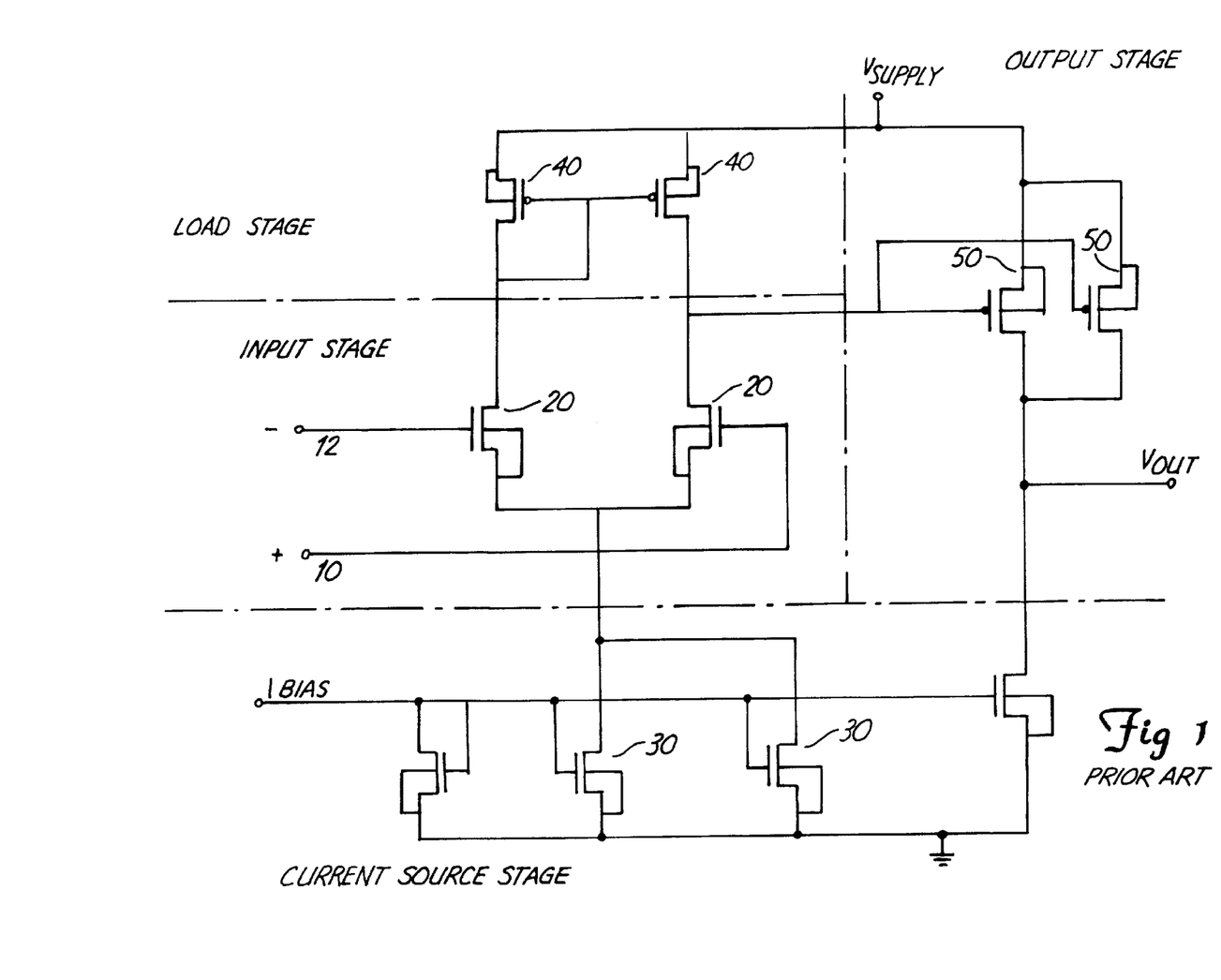
FIG. 1A is a block diagram illustrating a prior art PPS capable GPS receiver and method utilizing internal PPS measurement processing.
FIG. 1B is a block diagram illustrating a prior art PPS capable GPS receiver and method utilizing a PPS measurement interface over which classified data is passed.
Figure 1A:
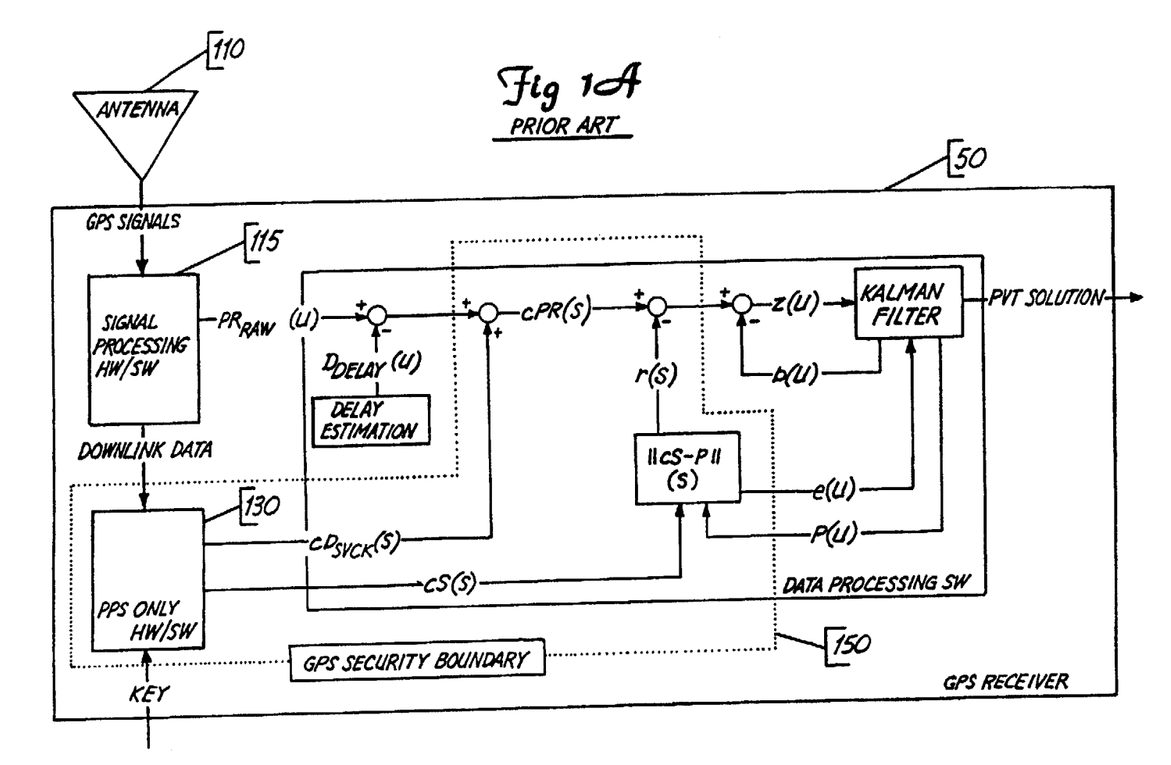

FIG. 1A diagrammatically illustrates a prior art PPS-capable GPS receiver 50 utilizing internal PPS measurement processing. PPS GPS receiver 50 includes GPS antenna 110, signal processing functions 115, and PPS only functions 130. Antenna 110 receives GPS signals from GPS satellites. Signal processing functions 115 receive the GPS signals as an input and provide as outputs a raw pseudorange $PR_{raw}$ measured by the receiver and extracted downlink data. PPS only functions 130 receive the downlink data and implement the various functions to provide the illustrated PPS related outputs.

As is the case with each of the prior art and inventive GPS receivers described and illustrated in the FIGS., the illustrated functions are typically implemented in software within one or more microprocessors or other controllers. However, implementation with other circuitry is also possible. In general, a reference to a particular function or step in this description or in the figures is also intended to represent the microprocessor(s) (or functional portions thereof) and/or other circuitry used to implement the functions. The present invention is not limited to any particular implementation of the illustrated methods.

Figure 1B:
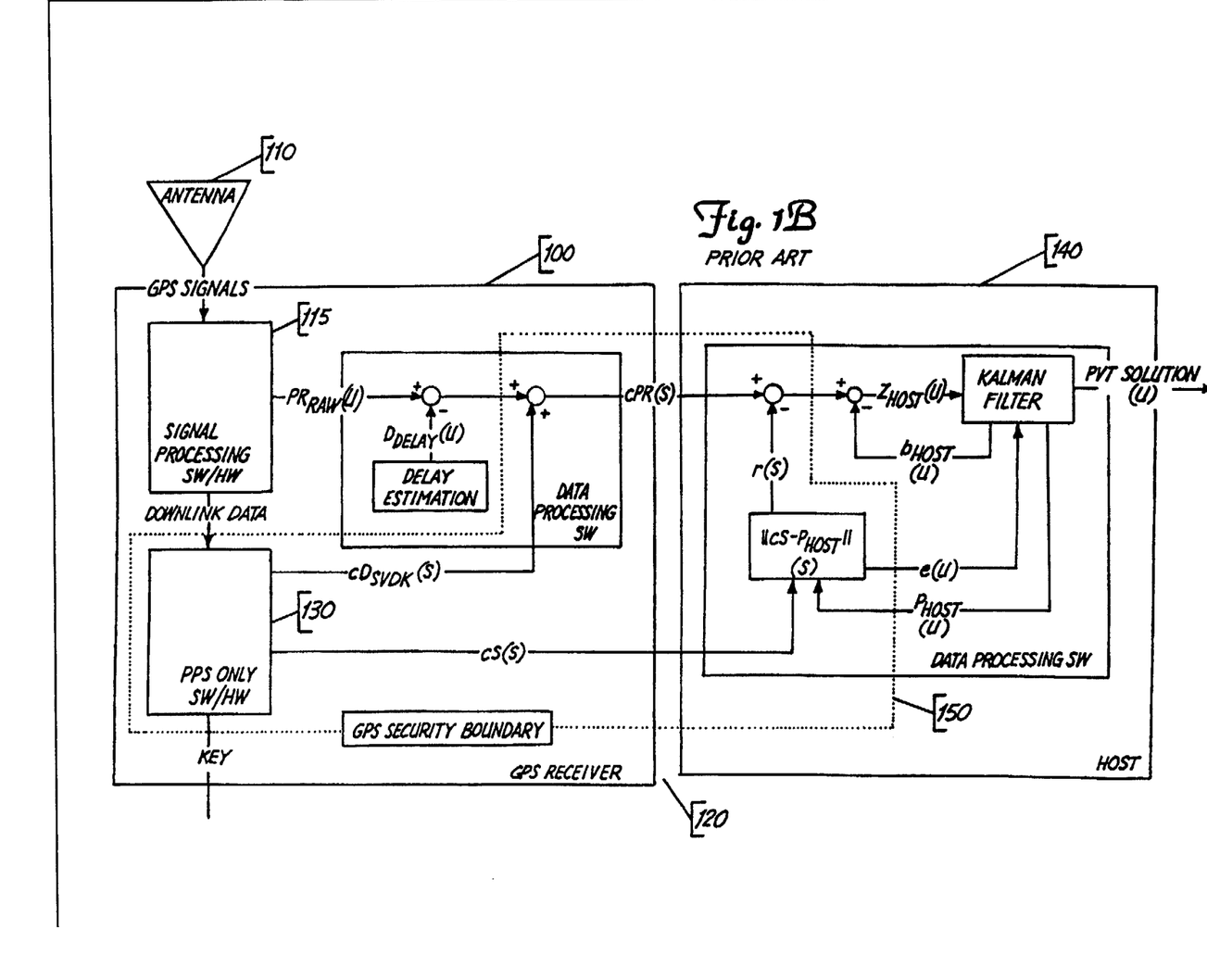

FIG. 1B diagrammatically illustrates a prior art PPS-capable GPS receiver 100 similar to GPS receiver 50 illustrated in FIG. 1A, but utilizing a PPS measurement interface to pass information to a host device 140. With the exception of the inclusion of PPS measurement interface 120, receivers 50 and 100 are substantially identical. (Note that FIG. 1B, for simplicity, does not show internal measurement processing which would normally be retained.) However, in receiver 100, host device 140 implements some of the illustrated functions such as processing pseudorange measurements outside of the GPS receiver. If GPS receiver 100 makes corrected satellite position and pseudorange measurements available over an external interface such as PPS measurement interface 120, the external interface is classified secret and the security boundary 150 of the receiver extends to include not only the relevant portions of circuitry and software implementing PPS data generating only functions 130, but also at least portions of the circuitry or software of host device or application 140.

Using the standard method employed by prior art PPS-capable GPS receivers, a keyed GPS receiver such as receiver 100 outputs the following classified information over the PPS measurement interface:

cS=satellite position derived using corrected ephemeris (S)

cPR=pseudorange measurement corrected for delays and authorized user satellite clock error (S) (=$PR_{raw}$-$D_{Delay}$+$cD_{SVclk}$)

Host device or application 140 can then, using software or other circuitry or functions, compute its own pseudorange residual $z_{Host}$, from the relationship described in Equation 1, and process such residuals from multiple satellites in a Kalman filter or other predict-correction algorithm, to obtain a solution for user position, velocity and time (PVT) that reflects PPS accuracy.

$$Z_{Host}=cPR-(\|cS-P_{Host}\|+b_{Host}) \qquad \text{Equation 1}$$

This method, along with the resulting security boundary 150, is depicted in FIG. 1B. Although receiver 50 illustrated in FIG. 1A does not include a PPS measurement interface across which classified information is passed, its method of determining the pseudorange residual z for use in determining the receiver's PVT still results in an extended security boundary 150.

Figure 2:
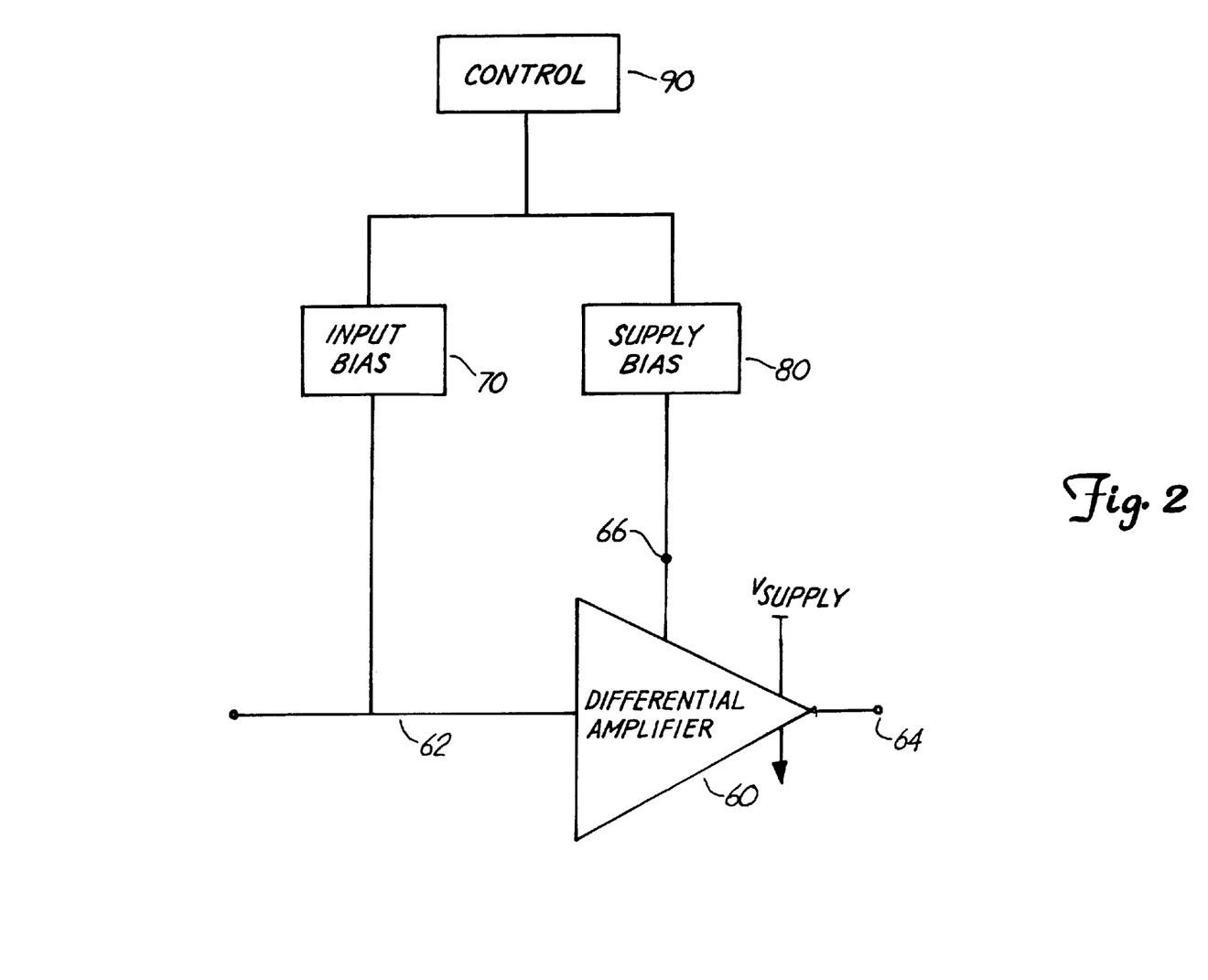
FIG. 2A is a block diagram illustrating a PPS capable GPS receiver having internal PPS measurement processing and employing a first method of the present invention.
FIG. 2B is a block diagram illustrating a PPS capable GPS receiver having a PPS measurement interface and employing the first method of the present invention.
Figure 2A:
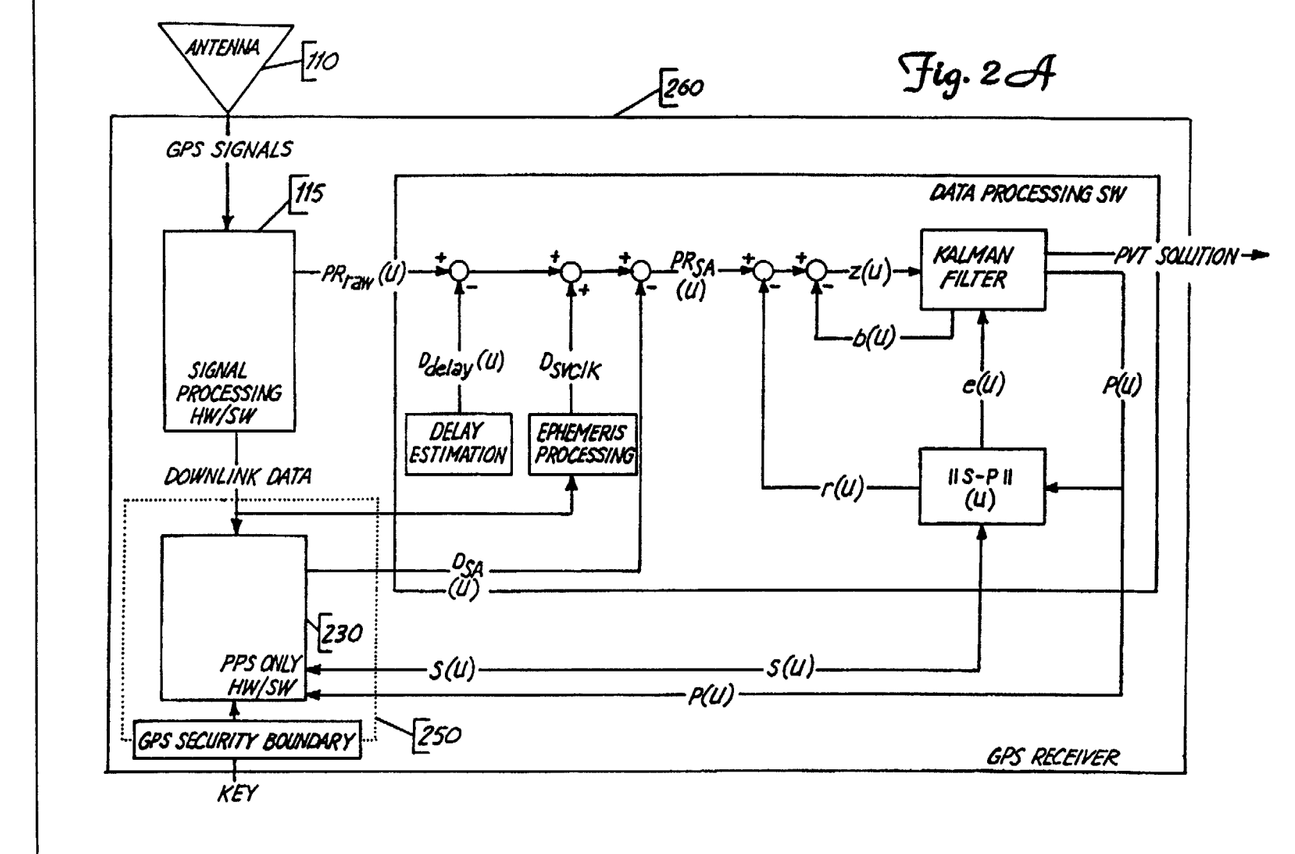
Figure 2B:
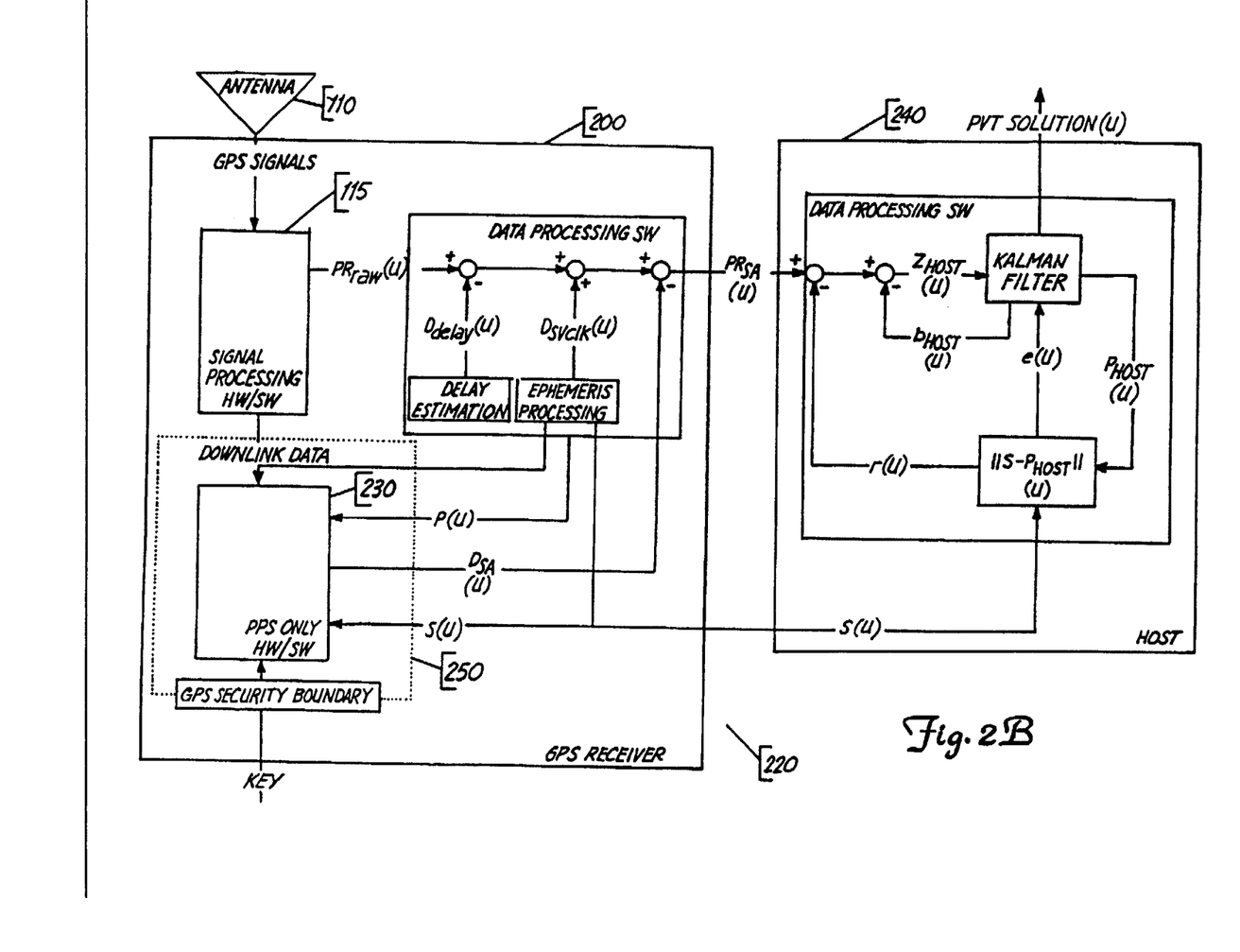

Standard PPS Measurement Interface with Innovation for Handling SA Corrections FIGS. 2A and 2B diagrammatically illustrate PPS-capable GPS receivers 200 and 260 in accordance with some embodiments of the present invention. Receiver 260 is substantially identical to receiver 200 in its method of PPS measurement processing, except that no PPS measurement interface is involved. The method employed by receivers 200 and 260 minimizes the security boundary 250 in either case. The following discussions of GPS receiver 200 apply to GPS receiver 260 as well, except that the host device functions are implemented within receiver 260 and interface 220 is therefore omitted.

Receiver 200 includes GPS antenna 110, signal processing functions 115, PPS measurement interface 220, and PPS only functions 230. Signal processing functions 115 receive the GPS signals from antenna 110 and provide as outputs downlink data and raw pseudorange measurements $PR_{raw}$. Using downlink data from signal processing functions 115, PPS data only functions 230 generate corrections to be applied to raw pseudorange. Using a method employed by receiver 200, the keyed GPS receiver outputs the following unclassified information over the PPS measurement interface 220:

S=satellite position derived using uncorrected ephemeris (U)

$PR_{SA}$=$PR_{raw}$-$D_{Delay}$+$D_{SVclk}$-$D_{SA}$(U)

Where the lump sum correction $D_{SA}$ for the net effect SA on pseuodrange is determined from Equation 2:

$$D_{SA}=\|cS-P\|-\|S-P\|+D_{SVclk}-cD_{SVclk}(U) \qquad \text{Equation 2}$$

Note that,

∥cS-P∥-∥S-P∥=net effect of correction to satellite position on range.

while, $D_{SVclk}$-$cD_{SVclk}$=effect of SA on SV clock error claimed for an unauthorized user.

Host device 240 can then compute the pseudorange residual $z_{host}$ using the relationship of Equation 3:

$$Z_{Host}=PR_{SA}-(\|S-P_{Host}\|+b_{Host}) \text{ (U)} \qquad \text{Equation 3}$$

By substituting the expansion of the $PR_{SA}$ and $D_{SA}$ terms, it can be shown that this pseudorange residual $Z_{Host}$ is equivalent to the pseudorange residual computed using the standard method, thereby allowing the host to compute a full PPS accuracy PVT solution.

Since S and $PR_{SA}$ are unclassified, these items can reside outside the GPS security boundary 250. Only the computation of the $D_{SA}$ term must reside within the GPS security boundary 250, thus allowing all measurement processing (within or outside the receiver 200) to be clear of the security boundary. Thus, the embodiment illustrated in FIGS. 2A and 2B minimizes the security boundary 250 such that the security boundary is limited to the PPS only functions 230.

Passive Residual PPS Measurement Interface

Figure 3:
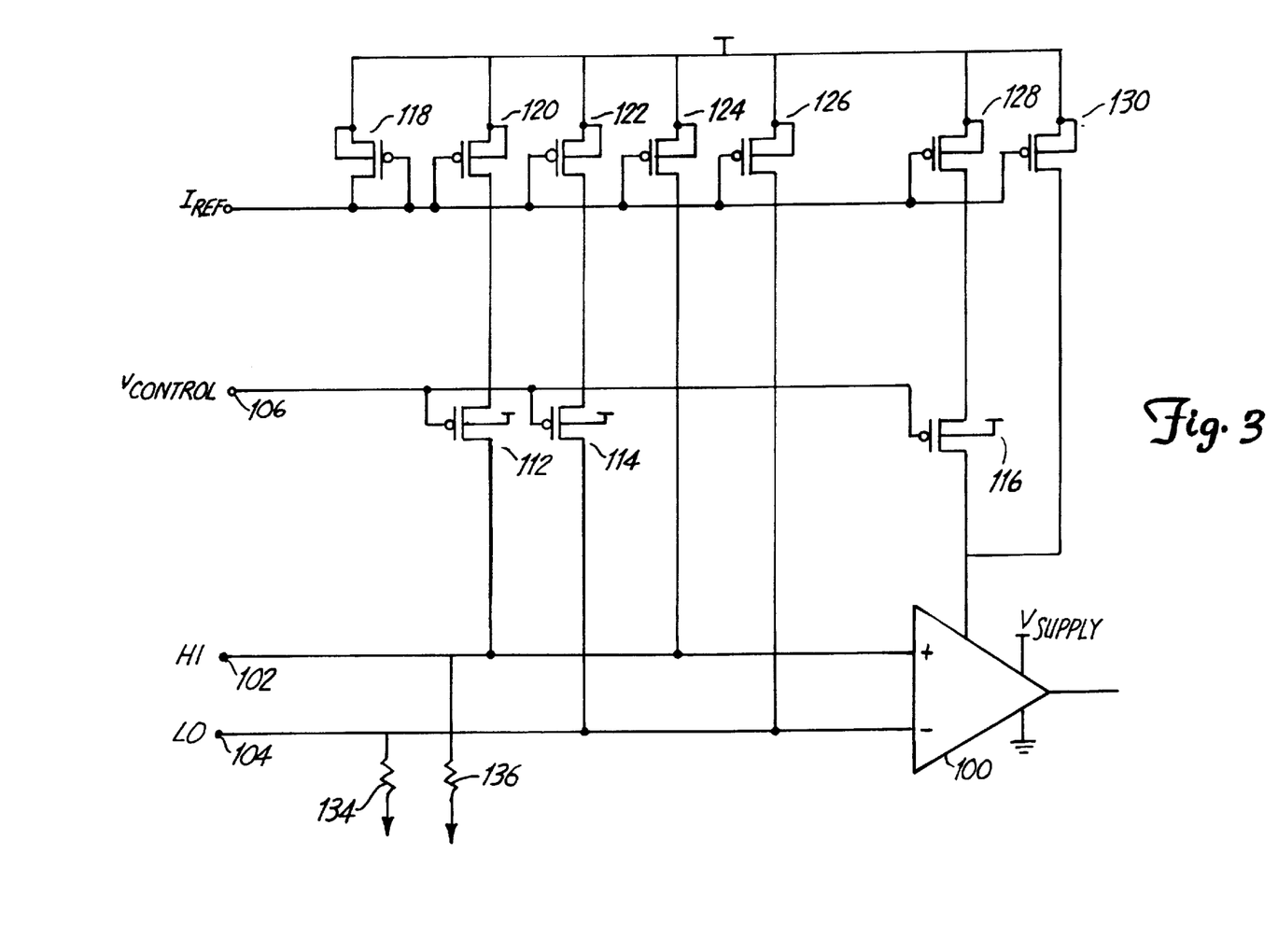
FIG. 3 is a block diagram illustrating a PPS capable GPS receiver having a PPS measurement interface and employing a second method of the present invention.

FIG. 3 diagrammatically illustrates PPS-capable GPS receiver 300, which is an alternate embodiment of the present invention utilizing a passive residual PPS measurement interface. Receiver 300 includes GPS antenna 110, signal processing functions 115, PPS measurement interface 320, PPS only functions 330 and data processing functions 360. Signal generating functions 115 receive the GPS signals from antenna 110 and provide as outputs raw pseudorange $PR_{raw}$ and downlink data. Using the downlink data and a position estimate P generated by data processing functions 360, PPS only functions 330 generate PPS corrections used to provide the illustrated PPS interface signals or data.

Using a method employed by keyed GPS receiver 300, the GPS receiver outputs at interface 320 the following unclassified information:

P=user position as estimated by the GPS receiver (U)

b=estimated receiver range bias (U)

e=corrected unit line of sight vector from user to satellite (U)

z=pseudorange residual as computed by the receiver (U)
=$(PR_{raw}-PR_{predicted})$ Where $PR_{predicted}$ is computed using the relationship shown in Equation 4:

$$PR_{predicated}=\|cS-P\|+b+D_{delay}-cD_{SVclk}(U) \quad \text{Equation 4}$$

The host device 340 computes its own pseudorange residual $Z_{Host}$ using the relationship shown in Equation 5:

$$Z_{host}=z-e \cdot (P_{host}-P)-(b_{host}-b) \quad \text{Equation 5}$$

This method has the limitation that $(P_{host}-P)$ must be relatively small for the first order approximation $e \cdot (P_{Host}-P)$ to be good. Since P, b, e and z are unclassified, these items can reside outside the GPS receiver's security boundary 350, thus limiting the necessary security review to the corresponding software and/or circuitry of PPS only functions 330.

Interactive Residual PPS Measurement Interface

Figure 4:
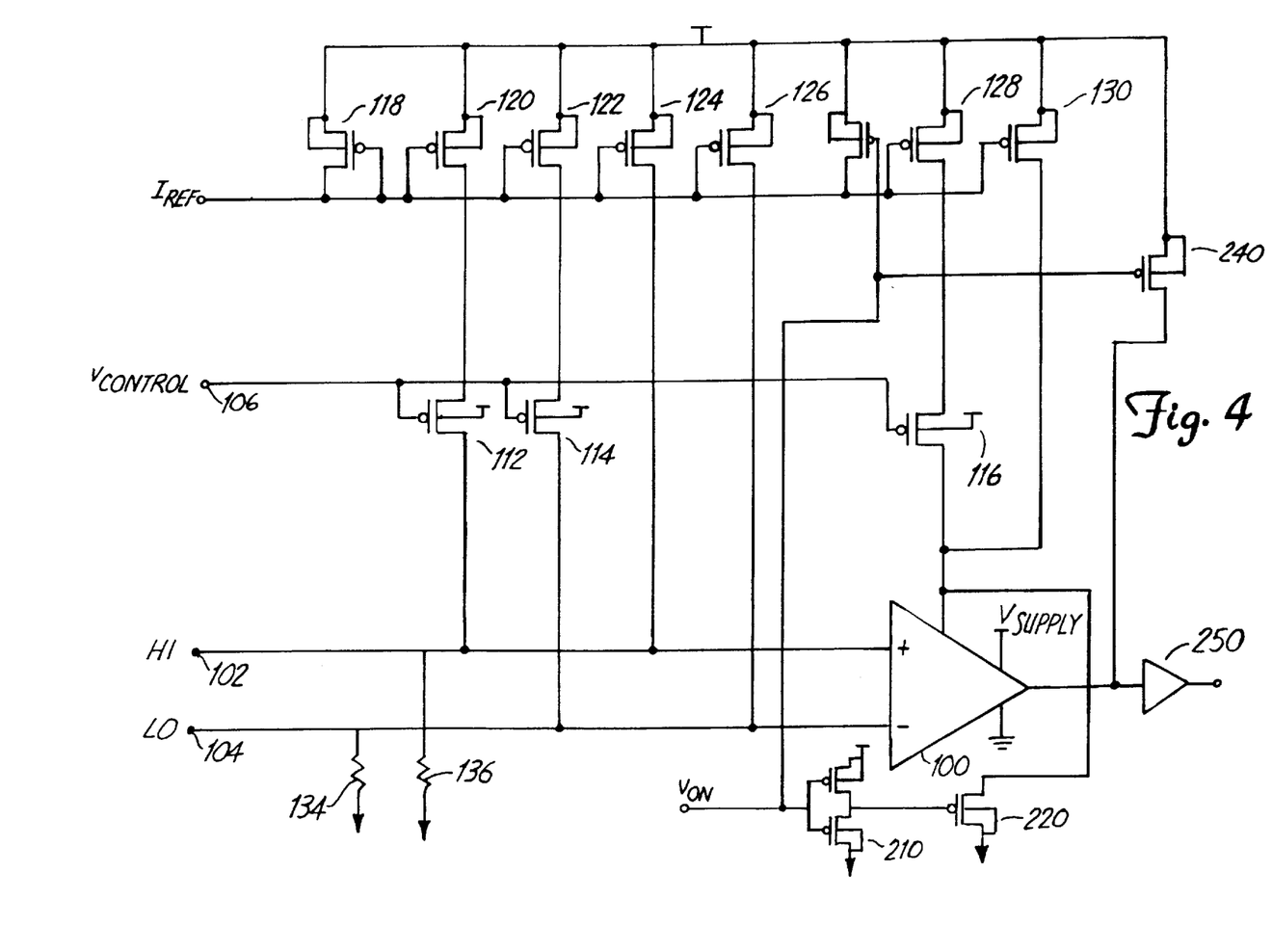
FIG. 4 is a block diagram illustrating a PPS capable GPS receiver having a PPS measurement interface and employing a third method of the present invention.

FIG. 4 diagrammatically illustrates PPS-capable GPS receiver 400, which is an alternate embodiment of the present invention utilizing an interactive residual PPS measurement interface. Receiver 400 includes GPS antenna 110, PPS measurement interface 420, signal processing functions 115, PPS only functions 430 and data processing functions 460. Using the downlink data and a position estimate $P_{Host}$ from host device 440, PPS only functions 430 provide the illustrated PPS corrected data necessary for the generation of the PPS interface data to be provided through interface 420. The method implemented by keyed GPS receiver 400 is the same as the passive residual method implemented by receiver 300, except that the receiver uses the host's estimates of position $P_{Host}$ and range bias $b_{Host}$ instead of its own.

Using the interactive residual method, keyed GPS receiver 400 must receive the following inputs from host application or device 440:

$P_{Host}$=host's estimate of user position (U)

$b_{Host}$=host's estimate of range bias (U)

Using these inputs, GPS receiver 400 computes and outputs the following unclassified information over the PPS measurement interface 420:

e=corrected unit line of sight vector from user to satellite (U)

$Z_{Host}$=pseudorange residual for the host as computed by the receiver (U)
=$(PR_{raw}-PR_{predicted})$ The $PR_{predicted}$ term is as defined for the passive residual method, except that estimates by host device 440 of P and b are used instead of the receiver's estimates, since and $Z_{Host}$ are unclassified, these items can reside outside the GPS receiver's security boundary 450.

Although the present invention has been described with reference to preferred embodiments, workers skilled in the art will recognize that changes may be made in form and detail without departing from the spirit and scope of the invention.

What is claimed is:

1. A method of determining a solution to a keyed global positioning system (GPS) receiver's position, velocity and time (PVT), the method comprising:

generating unclassified precise positioning service (PPS) data within the receiver; and determining the solution to the GPS receiver's position, velocity and time exclusively as function of the unclassified PPS data.

2. The method of claim 1, wherein generating unclassified PPS data within the receiver further comprises providing the unclassified PPS data over a PPS measurement interface to a host device such that all of the data provided over the PPS measurement interface is unclassified data, and such that a PPS accurate solution for position, velocity and time of the GPS receiver can be determined exclusively as a function of the data provided over the PPS measurement interface.

3. The method of claim 2, wherein the unclassified PPS data provided over the PPS measurement interface includes a satellite position S derived using an uncorrected ephemeris, includes a pseudorange measurement $PR_{SA}$ to which an unkeyed receiver deterministic correction and a lump sum selective availability SA correction $D_{SA}$ have been applied.

4. The method of claim 3, wherein tie lump sum correction $D_{SA}$ applied to the pseudorange measurement $PR_{SA}$ is determined using the relationship:

$$D_{SA}=\|cS-P\|-\|S-P\|+D_{SVclk}-cD_{SVclk}.$$

5. The method of claim 4, and further comprising determining in the host device a pseudorange residual $Z_{Host}$ using the relationship:

$$Z_{Host}=PR_{SA}-(\|S-P_{Host}\|+b_{Host}).$$

6. The method of claim 2, wherein the unclassified PPS data provided over the PPS measurement interface to the host device includes a position P of the GPS receiver estimated by the GPS receiver, an estimated receiver range bias b, a corrected unit line of sight vector e from the GPS receiver to a satellite, and a pseudorange residual z determined by the receiver.

7. The method of claim 6, wherein the pseudorange residual z determined by the receiver is determined by the receiver using the relationship:

$$z=(PR_{raw}-PR_{predicted})$$

where $PR_{predicted}$ is determined using the relationship:

$$PR_{predicted}=\|cS-P\|+b+D_{delay}-cD_{SVclk}.$$

8. The method of claim 7, and further comprising determining a pseudorange residual $Z_{Host}$ in the host using the relationship:

$$z_{host}=z-e\cdot(P_{host}-P)-(b_{host}-b).$$

9. The method of claim 2, and further comprising:
receiving from the host device a host generated estimate $P_{Host}$ of the position of the GPS receiver and a host generated estimate $b_{Host}$ of range bias; and
wherein the unclassified PPS data provided by the receiver over the PPS measurement interface includes a corrected unit line of sight vector e from the GPS receiver to a satellite, and a pseudorange residual $z_{Host}$ for the host device.

10. The method of claim 9, wherein the pseudorange residual $z_{Host}$ for the host device provided by the receiver is determined by the receiver using the relationship:

$$z_{Host}=(PR_{raw}-PR_{predicted})$$

where $PR_{predicted}$ is determined using the relationship:

$$PR_{predicted}=\|cS-P_{Host}\|+b_{Host}+D_{delay}-cD_{SVckl}.$$

11. A keyed global positioning system (GPS) receiver comprising:
a precise positioning service (PPS) measurement interface; and
PPS measurement interface circuitry coupled to the PPS measurement interface, wherein the PPS measurement interface circuitry is adapted to generate the interface data such that all of the interface data provided over the PPS measurement interface is unclassified data, and such that a PPS accuracy solution for position, velocity and time of the GPS receiver can be determined exclusively as a function of the interface data provided over the PPS measurement interface.

12. The GPS receiver of claim 11, and further comprising a host device coupled to the PPS measurement interface and receiving the PPS measurement interface data, wherein the host device is adapted to determine the solution for position, velocity and time of the GPS receiver exclusively as a function of the interface data provided over the PPS measurement interface.

13. The GPS receiver of claim 12, wherein the unclassified PPS measurement interface data provided by the PPS measurement interface circuitry over the PPS measurement interface includes a satellite position S derived using an uncorrected ephemeris, and includes a pseudorange measurement $PR_{SA}$ to which an unkeyed receiver deterministic correction and a lump sum selective availability SA correction $D_{SA}$ have been applied.

14. The GPS receiver of claim 13, wherein the lump sum correction $D_{SA}$ applied to the pseudorange measurement $PR_{SA}$ is determined using the relationship:

$$D_{SA}=\|cS-P\|-\|S-P\|+D_{SVclk}-cD_{SVclk}.$$

15. The GPS receiver of claim 14, wherein the host device is adapted to compute a pseudorange residual $Z_{Host}$ using the relationship:

$$Z_{Host}=PR_{SA}-(\|S-P_{Host}\|+b_{Host}).$$

16. The GPS receiver of claim 12, wherein the unclassified PPS measurement interface data provided by the PPS measurement interface circuiting over the PPS measurement interface includes a position P of the GPS receiver as estimated by the GPS receiver, an estimated receiver range bias b, a corrected unit lineof sight vector e from the GPS receiver to a satellite, and a pseudorange residual z determined by the receiver.

17. The GPS receiver of claim 16, wherein the pseudorange residual z determined by the receiver is determined by the receiver using the relationship:

$$z=(PR_{raw}-PR_{predicted})$$

where $PR_{predicted}$ is determined using the relationship:

$$PR_{predicted}=\|cS-P\|+b+D_{delay}-cD_{SVclk}.$$

18. The GPS receiver of claim 17, wherein the host device is adapted to compute a pseudorange residual $Z_{Host}$ using the relationship:

$$z_{host}=z-e\cdot(P_{host}-P)-(b_{host}-b)$$

19. The GPS receiver of claim 12, wherein the PPS measurement interface circuitry receives as an input from the host device a host generated estimate $P_{Host}$ of the position of the GPS receiver and a host generated estimate $b_{Host}$ of range bias, wherein unclassified PPS measurement interface data provided by the PPS measurement interface circuitry over the PPS measurement interface includes a corrected unit line of sight vector e from the GPS receiver to a satellite, and a PPS measurement interface circuitry generated pseudorange residual $z_{Host}$ for the host device.

20. The GPS receiver of claim 19, wherein the PPS measurement interface circuitry generates the pseudorange residual $z_{Host}$ for the host device using the relationship:

$$z_{Host}=(PR_{raw}-PR_{predicted})$$

where $PR_{predicted}$ is determined using the relationship:

$$PR_{predicted}=\|cS-P_{Host}\|+b_{Host}+D_{delay}-cD_{SVckl}.$$

21. A keyed global positioning system (GPS) receiver comprising:
a precise positioning service (PPS) measurement interface; and
PPS measurement interface generating means coupled to the PPS measurement interface for generating interface data which is provided over the PPS measurement interface, wherein the generating means is adapted to generate the interface data such that all of the interface data provided over the PPS measurement interface is unclassified data, and such that a PPS accurate solution for position, velocity and time of the GPS receiver can be determined exclusively as a function of the interface data provided over the PPS measurement interface.

22. The GPS receiver of claim 21, wherein the unclassified PPS measurement interface data provided by the generating means over the PPS measurement interface includes a satellite position S derived using an uncorrected ephemeris, and includes a pseudorange measurement $PR_{SA}$ to which an unkeyed receiver deterministic correction and a lump sum selective availability SA correction $D_{SA}$ have been applied.

23. The GPS receiver of claim 22, wherein the lump sum correction $D_{SA}$ applied to the pseudorange measurement $PR_{SA}$ is determined using the relationship:

$$D_{SA} = \|cS - P\| - \|S - P\| + D_{SVclk} - cD_{SVclk}.$$

24. The GPS receiver of claim 23, and further including a host device coupled to the PPS measurement interface and receiving the interface data over the interface, wherein the host device is adapted to determine the solution for position, velocity and time of the GPS receiver exclusively as a function of the interface data provided over the PPS measurement interface, and wherein the host device is adapted to determine a pseudorange residual $Z_{Host}$ using the relationship:

$$Z_{Host} = PR_{SA} - (\|S - P_{Host}\| + b_{Host}).$$

25. The GPS receiver of claim 21, wherein the unclassified PPS measurement interface data provided by the generating means over the PPS measurement interface includes a position P of the GPS receiver estimated by the GPS receiver, an estimated receiver range bias b, a corrected unit line of sight vector e from the GPS receiver to a satellite, and a pseudorange residual z determined by the receiver.

26. The GPS receiver of claim 25, wherein the pseudorange residual z determined by the receiver is determined by the receiver using the relationship:

$$z = (PR_{raw} - PR_{predicted})$$

where $PR_{predicted}$ is determined using the relationship:

$$PR_{predicted} = \|cS - P\| + b + D_{delay} - cD_{SVclk}.$$

27. The GPS receiver of claim 26, and further including a host device coupled to the PPS measurement interface and receiving the interface data over the interface, wherein the host device is adapted to determine the solution for position, velocity and time of the GPS receiver exclusively as a function of the interface data provided over the PPS measurement interface, and wherein the host device is adapted to determine a pseudorange residual $Z_{Host}$ using the relationship:

$$z_{host} = z - e \cdot (P_{host} - P) - (b_{host} - b).$$

28. The GPS receiver of claim 21, and further including a host device coupled to the PPS measurement interface and receiving the interface data from the generating means over the interface, wherein the generating means receives as an input from the host device a host generated estimate $P_{Host}$ of the position of the GPS receiver and a host generated estimate $b_{Host}$ of range bias, wherein the unclassified PPS measurement interface data provided by the generating means over the PPS measurement interface includes a corrected unit line of sight vector e from the GPS receiver to a satellite, and a pseudorange residual $z_{Host}$ for the host device.

29. The GPS receiver of claim 28, wherein the generating means generates the pseudorange residual $z_{Host}$ for the host device using the relationship:

$$z_{Host} = (PR_{raw} - PR_{predicted})$$

where $PR_{predicted}$ is determined using the relationship:

$$PR_{predicted} = \|cS - P_{Host}\| + b_{Host} + D_{delay} - cD_{SVckl}.$$

* * * * *

UNITED STATES PATENT AND TRADEMARK OFFICE
CERTIFICATE OF CORRECTION

PATENT NO. : 6,018,314
DATED : January 25, 2000
INVENTOR(S) : Steven A. Harshbarger et al It is certified that error appears in the above-identified patent and that said Letters Patent is hereby corrected as shown below:

The title page, showing the illustrative figure should be deleted to be replaced with the attached title page.

In the drawings, sheets 1-4, consisting of Figs. 1-4 should be deleted to be replaced with the corrected drawings, consisting of Figs. 1A, 1B, 2A, 2B, 3 and 4, as shown on the attached pages.

Signed and Sealed this

Seventh Day of August, 2001

*Attest:*

*Attesting Officer*

NICHOLAS P. GODICI
*Acting Director of the United States Patent and Trademark Office*

United States Patent [19]
Harshbarger et al.

[11] Patent Number: 6,018,314
[45] Date of Patent: Jan. 25, 2000

[54] METHOD FOR OBTAINING PPS ACCURACY USING AN UNCLASSIFIED GPS RECEIVER MEASUREMENT INTERFACE

[75] Inventors: Steven A. Harshbarger; Jean J. Pollari, both of Cedar Rapids; Mark R. Wagner, Marion, all of Iowa

[73] Assignee: Rockwell International Corporation, Milwaukee, Wis.

[21] Appl. No.: 09/026,192

[22] Filed: Feb. 19, 1998

[51] Int. Cl.[7] .................... G01S 5/02; H04B 7/185
[52] U.S. Cl. .................... 342/357.06; 342/357.01; 701/213
[58] Field of Search .................... 342/357.01, 357.06, 342/352; 701/213; 380/23

[56] References Cited

U.S. PATENT DOCUMENTS

| | | |
|---|---|---|
| 5,311,194 | 5/1994 | Brown .................... 342/357 |
| 5,689,271 | 11/1997 | Lennen .................... 342/357 |
| 5,757,916 | 5/1998 | MacDoran et al. .................... 380/25 |

*Primary Examiner*—Thomas H. Tarcza
*Assistant Examiner*—Dao L. Phan
*Attorney, Agent, or Firm*—Kyle Eppele; James P. O'Shaughnessy

[57] ABSTRACT

Disclosed are methods for minimizing the security boundary of PPS GPS receivers. The primary disclosure is a lump sum SA correction method. This method can be used to limit the security boundary to the portion of the GPS receiver that generates the lump sum SA correction, allowing all PPS measurement processing (within the receiver or across a PPS measurement interface) to reside outside the security boundary. In addition, two methods are disclosed (passive residual method and active residual method) by which the data content of the PPS measurement interface is entirely unclassified when keyed, thereby limiting the security boundary to the GPS receiver itself.

29 Claims, 4 Drawing Sheets